(12) United States Patent
Randall et al.

(10) Patent No.: US 7,923,395 B2
(45) Date of Patent: *Apr. 12, 2011

(54) C0G MULTI-LAYERED CERAMIC CAPACITOR

(75) Inventors: Michael S. Randall, Simpsonville, SC (US); Corey Antoniades, Seneca, SC (US); Daniel E. Barber, Fuquay-Varina, NC (US); Xilin Xu, Simpsonville, SC (US); James Beeson, Simpsonville, SC (US); Pascal Pinceloup, Simpsonville, SC (US); Abhijit Gurav, Greenville, SC (US); Thomas Poole, Duncan, SC (US); Azizuddin Tajuddin, Laurens, SC (US); Ian Burn, Hockessin, DE (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/876,141

(22) Filed: Oct. 22, 2007

(65) Prior Publication Data

US 2008/0107800 A1 May 8, 2008

Related U.S. Application Data

(63) Continuation-in-part of application No. 11/273,548, filed on Nov. 14, 2005, now abandoned.

(60) Provisional application No. 60/669,110, filed on Apr. 7, 2005.

(51) Int. Cl.
C04B 35/465 (2006.01)
C04B 35/47 (2006.01)
(52) U.S. Cl. ........................ 501/135; 501/136
(58) Field of Classification Search .................. 501/135, 501/136; 361/321.4
See application file for complete search history.

(56) References Cited

U.S. PATENT DOCUMENTS

| 4,607,018 | A | | 8/1986 | Nishioka et al. | 501/135 |
|---|---|---|---|---|---|
| 4,859,641 | A | * | 8/1989 | Fujino et al. | 501/136 |
| 5,082,810 | A | | 1/1992 | Bergna | 501/134 |
| 5,204,301 | A | | 4/1993 | Ohkubo et al. | 501/136 |
| 6,118,648 | A | | 9/2000 | Kojima et al. | 361/311 |
| 6,233,134 | B1 | | 5/2001 | Sakamoto et al. | 361/311 |
| 6,268,054 | B1 | | 7/2001 | Costantino et al. | 428/403 |

(Continued)

FOREIGN PATENT DOCUMENTS

DE 3444982 * 6/1985

(Continued)

OTHER PUBLICATIONS

International Search Report and Written Opinion of the International Searching Authority, Aug. 16, 2007 Dessaux.

(Continued)

Primary Examiner — Karl E Group
(74) Attorney, Agent, or Firm — Joseph T. Guy; Nexen Pruet, LLC

(57) ABSTRACT

A dielectric ceramic composition in a multilayer ceramic capacitor with a composition of formula:

$$\{[(CaO)_t(SrO)_{1-t}]_m[(ZrO_2)_v(TiO_2)_{1-v}]\}_{1-s-x}A_sE_x$$

wherein:
A is a transition metal oxide;
E is an oxide of an element selected from the group consisting of Ge, Si, Ga and combination thereof;
m is 0.98 to 1.02;
t is 0.50 to 0.90;
v is 0.8 to 1.0;
s and x are selected from the group consisting of: a) $0 \leq x \leq 0.08$, $0.0001 \leq s \leq 0.043$ and $x \geq 1.86s$; and b) $0 \leq 0.0533$, $0.0001 \leq s \leq 0.08$ and $x \leq 0.667s$.

15 Claims, 1 Drawing Sheet

U.S. PATENT DOCUMENTS

| | | |
|---|---|---|
| 6,295,196 B1 | 9/2001 | Hamaji et al. .............. 361/321.2 |
| 6,329,311 B1 | 12/2001 | Fujii et al. ...................... 501/136 |
| 6,387,835 B2 | 5/2002 | Kim et al. ...................... 501/136 |
| 6,396,681 B2 | 5/2002 | Naito et al. ................ 361/321.4 |
| 6,525,628 B1 | 2/2003 | Ritter et al. ................... 333/172 |
| 6,572,793 B2 | 6/2003 | Fukui et al. ................ 252/520.2 |
| 6,645,897 B2 | 11/2003 | Nakamura et al. ............ 501/137 |
| 6,656,863 B2 | 12/2003 | Fukui et al. .................... 501/136 |
| 6,790,801 B2 | 9/2004 | Kim et al. ...................... 501/136 |
| 6,809,052 B2 | 10/2004 | Horie et al. .................... 501/138 |
| 6,858,554 B2 | 2/2005 | Moon et al. ................... 501/136 |
| 7,172,985 B2 | 2/2007 | Pinceloup et al. ............ 501/135 |
| 2001/0018117 A1 | 8/2001 | Fukui et al. .................... 428/210 |
| 2002/0016249 A1 | 2/2002 | Saito et al. ..................... 501/139 |
| 2003/0186802 A1 | 10/2003 | Watanabe et al. ............. 501/136 |
| 2004/0209055 A1 | 10/2004 | Lee et al. ....................... 428/212 |
| 2004/0220043 A1 | 11/2004 | Fukui et al. .................... 501/136 |
| 2005/0100666 A1 | 5/2005 | Hampden-Smith et al. .. 427/212 |
| 2005/0111163 A1 | 5/2005 | Ito et al. ......................... 361/311 |
| 2005/0128683 A1 | 6/2005 | Watanabe et al. .......... 361/321.4 |

FOREIGN PATENT DOCUMENTS

| | | | |
|---|---|---|---|
| JP | 63289708 | * | 11/1988 |
| JP | 63289709 | * | 11/1988 |
| JP | 2004075452 | * | 3/2004 |
| JP | 2005179105 | | 7/2005 |
| WO | 88/08830 | | 11/1998 |

OTHER PUBLICATIONS

The Institute of Electrical Engineers, Stevenage, GB, 1997, Yoneda Y. et al., Reliability and application of low fired multilayer capacitor having copper inner electrode, XP002443563, Database Accession No. 6015875 (abstract).

* cited by examiner

C0G MULTI-LAYERED CERAMIC CAPACITOR

CROSS-REFERENCE TO RELATED APPLICATIONS

This application is a continuation-in-part of abandoned U.S. patent Ser. No. 11/273,548 filed Nov. 14, 2005 which, in turn, claims the benefit of U.S. Provisional Patent Appl. No. 60/669,110 filed Apr. 7, 2005 both of which are incorporated herein by reference.

FIELD OF THE INVENTION

This application relates to ceramic capacitors having either a noble metal or base metal electrode which conforms to the Electronics Industry Alliance (EIA) Standard No. 198-1-F-2002 for temperature coefficient standard C0G. U.S. Pat. No. 7,172,985 is also incorporated herein by reference.

BACKGROUND AND PRIOR ART

C0G capacitors have very low temperature drift Temperature Coefficient of Capacitance (TCC) ($\leq +/-30$ ppm/° C.). Typically, the primary components of the ceramic include magnesium titanate or barium neodymium titanate.

The use of base metal electrodes such as Ni, Cu, and 80 Ni:20 Cu for capacitors offer significant material cost advantages over noble metals or precious metal electrodes such as Pt, Pd, Au, Ag and combinations thereof. Ni and Cu are conductive, comparatively inexpensive metals which, in pure form, are not facilely oxidized. Both can be deposited as electrodes using screen printing processes on the same equipment conventionally used for depositing noble metals. Ni has a higher melting point (Ni mp 1450° C.; Cu mp 1083° C.—*Weast Handbook of Chemistry & Physics, 46th* edition) and is preferred for multi-layered ceramic capacitors (MLCC) fired at higher temperatures.

While the ceramic dielectrics of this invention may be used with precious metals to obtain C0G MLCC capacitors (which may be fired in oxidative environments), BME capacitors are preferred.

Numerous compositions have been disclosed for non-reducing type dielectric ceramic compositions including U.S. Pat. Nos. 5,204,301; 6,118,648; 6,295,196; 6,329,311; 6,387,835; 6,396,681; 6,327,311; 6,525,628; 6,572,793; 6,645,897; 6,656,863; 6,858,554 and 7,172,985 as well as published patent application numbers US 2005/0111163; US 2003/0186802 and US 2004/0220043. These disclosures are directed to various combinations of Ca, Sr, Zr, Ti and Ba oxides with or without limited amounts of dopant oxides or alkaline, alkaline earth and rare earth metals wherein individual precursors are fired to form a ceramic matrix. These ceramics, though beneficial, are still inferior with regards to overall capacitor performance. There has been an ongoing effort in the art to provide a capacitor with improved properties and, specifically, to ceramics which can provide an improved capacitor.

BRIEF DESCRIPTION OF THE INVENTION

It is a first objective of this invention to provide a Base Metal Electrode (BME) Multilayer Ceramic Capacitor (MLCC) device having a high CV (capacitance per unit volume).

It is a second objective of this invention to produce an MLCC device which meets the C0G specification for Temperature Coefficient of Capacitance ($\leq +/-30$ ppm/° C.).

It is a further objective of this invention to provide a MLCC capacitor meeting C0G specifications which can be produced at a price competitive with lower performing devices such as those meeting C0H, C0J, C0K, SL, R2J, X7R, etc., and lower specifications, and which meet industry standards for reliability.

These and other advantages are provided in a dielectric ceramic composition in a multilayer ceramic capacitor with a composition of formula:

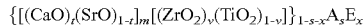

wherein:
A is a transition metal oxide;
E is an oxide of an element selected from the group consisting of Ge, Si, Ga and combination thereof;
m is 0.99 to 1.02;
t is 0.50 to 0.90;
v is 0.8 to 1.0;
s and x are selected from the group consisting of: a) $0 \leq x \leq 0.08$, $0.0001 \leq s \leq 0.043$ and $x \geq 1.86s$; and b) $0 \leq 0.0533$, $0.0001 \leq s \leq 0.08$ and $x \leq 0.667s$.

Yet another embodiment is provided in a method for forming a capacitor comprising:
a) milling to a D50 of less than 1.0 μm a material comprising:

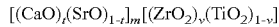

wherein m is 0.98 to 1.02; and
t is 0.50 to 0.90; and
v is 0.8 to 1.0;
thereby forming a first component (C1);
b) milling $MnO_2$, $MnCO_3$ or another oxidized form of Mn to a D50 of less than 1.0 μm thereby forming a second component (C2);
c) milling $SiO_2$ to a D50 of less than 0.50 μm thereby forming a third component (C3);
d) combining the first component, the second component and the third component with a solvent in a ratio $C1_{1-\alpha-\beta}C2_\alpha C3_\beta$ thereby forming a coating solution;
e) applying said coating solution to a tape in an amount selected from the group consisting of a) sufficient to form a ceramic layer over 4.5 μm thick wherein α and β are defined as $0 \leq \beta \leq 0.08$, $0.0001 \leq \alpha \leq 0.043$ and $\beta \geq 1.86\alpha$; and b) sufficient to form a ceramic layer of no more than 4.5 μm thick wherein α and β are defined as $0 \leq \beta \leq 0.0533$, $0.0001 \leq \alpha \leq 0.08$ and $0 \leq 0.667\alpha$;
f) drying the coating solution to form a green coating;
g) depositing an ink comprising electrode material over said green coating to form electroded green layers;
h) stacking non-electroded green layers and electroded green layers to form a green capacitor stack;
i) dicing the capacitor stack to form singular green multilayer chips;
j) firing the singular green multilayer chips in an atmosphere with a $PO_2$ of $10^{-6}$ to $10^{-16}$; and
k) forming terminals in electrical contact with the electrode material.

DETAILED DESCRIPTION OF THE INVENTION

Figure 1:
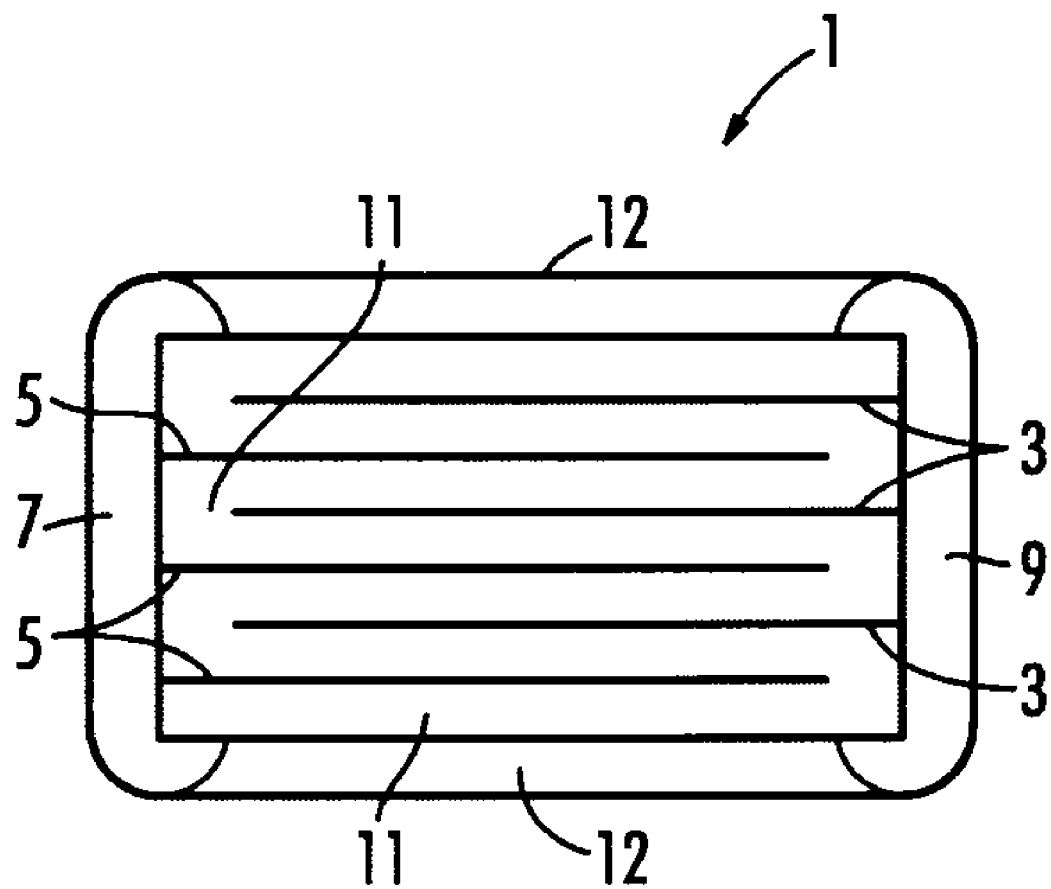
FIG. 1 is a side view of a multilayer ceramic capacitor according to this invention.

The use of base metals as the conductive metal in a capacitor electrode allows the performance in the capacitor to be maintained while decreasing materials cost. FIG. 1 is a side view of a conventional multi-layer or stacked ceramic capacitor 1. Conductive plates 3, 5 serve as electrodes and are connected to terminations 7, 9 in alternating order. The electrodes are separated or isolated by dielectric ceramic 11. A resin, 12, encases a portion of the capacitor as known in the art.

The electrodes 3, 5 may be made from any conductive material but are typically noble metals such as Pt, Pd, Au or Ag. Since noble metals are difficultly oxidized, when the green stacked plates are fired, high temperatures and an oxidizing atmosphere may be used, and a ceramic having a high dielectric constant is obtained. Good temperature coefficients of capacitance may be obtained.

The use of base metals requires modifications in the composition of the ceramic and in the conditions of firing. Formulations are desired which have a low Temperature Coefficient of Capacitance (TCC), preferably meeting the EIA C0G standard ($\leq +/-30$ ppm/° C.).

Through diligent research a complex relationship between composition and dielectric thickness has been determined. In general, at a ceramic thickness above 4.5 μm a composition which is relatively rich in an oxide of group III or group IV demonstrates a significant increase in capacitor performance and at a ceramic thickness below 4.5 μm a composition which is relatively rich in transition metal oxide demonstrates a significant increase in capacitor performance as more thoroughly discussed herein.

Preferred ceramics are defined according to formula (I).

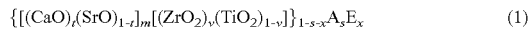

$$\{[(CaO)_t(SrO)_{1-t}]_m[(ZrO_2)_v(TiO_2)_{1-v}]\}_{1-s-x}A_sE_x \qquad (1)$$

In formula (1) A is a transition metal oxide preferably selected from Cu, Mn, Mo, W, Co, Ta, Sc, Y, Hf, V, Nb, Cr and combinations thereof; Most preferably A is manganese oxide. E is an oxide of a group III or IV element selected from Ge, Si, Ga and combinations thereof. Subscripts in formula (1) have the following values: m is 0.98 to 1.02; t is 0.50 to 0.90 and v is 0.8 to 1.0. When the ceramic is applied at a thickness above 4.5 μm the subscripts s and x are defined as $0.0001 \leq s \leq 0.043$; $0 \leq x \leq 0.08$ and $x \geq 1.86s$. When the ceramic is applied at a thickness of 4.5 μm or less, the subscripts s and x are defined as $0.0001 \leq s \leq 0.08$; $0 \leq x \leq 0.0533$ and $x \leq 0.667s$.

The compound of formula (1) is unique in that a precursor material defined as $[(CaO)_t(SrO)_{1-t}]_m[(ZrO_2)_v(TiO_2)_{1-v}]$ is mixed with an appropriate amount of a precursor of a dopant oxide. The method typically employed in the art includes the firing of a mixture of oxide precursors, such as carbonates, thereby forming a single phase of a primary material and secondary phases dependant on ratios of reactants and the phase compositions. Oxide precursors are materials which are an oxide after heating as described herein. Particularly preferred oxide precursors include oxides, carbonates, oxalates, peroxides, acetates, nitrates and the like. In the present application the primary phase is predetermined as the (Ca,Sr)(Zr,Ti)O$_3$ material and dopants are added thereto which, presumably, form phases differing from that formed by firing precursors of the oxides of calcium, strontium, zirconium, titanium and dopants. As well known to those of skill in the art, minor variations in composition, either globally or locally, can result in phases which are neither predictable nor controllable. Therefore, with the prior art techniques there may be unintentional secondary phases formed and these vary from batch to batch and therefore from capacitor to capacitor. The material prepared herein provides a ceramic with greatly improved consistency and provides unpredicted advantages with regards to C0G relative to ceramic materials formed in accordance with the prior art.

A particularly preferred formulation is provided with a base material of $(CaO)_{0.7}(SrO)_{0.3}(ZrO_2)_{0.97}(TiO_2)_{0.03}$ which is preferably doped with one or more of MnO, MnO$_2$, MnCO$_3$, SiO$_2$. All formulations are milled at the slurry or slip stage in a suitable milling solution such as water, alcohol, toluene or a combination thereof, or dihydroterpinol (DHT) or other suitable milling solutions using suitable media to a size of D$_{50}$ ca.<1.0 μm or less. The slip is spread on a carrier film material using a doctor blade. The electrodes are preferably deposited via screen printing using a conductive ink. The chips are laminated, diced, burned out and fired in a reducing atmosphere of PO$_2$ equal to about 10$^{-6}$ or less. Soak temperatures from 1200° C. to 1350° C. may be selected.

C0G ceramic capacitors can be made using the mole % of MnO$_2$ and SiO$_2$ present in amounts between 0 and ~8 mole %. When the ceramic is applied at a thickness above 4.5 μm the mole ratio of MnO$_2$ is at least 0.01 mole percent to no more than 4.3 mole percent and the SiO$_2$ is present in no more than 8 mole percent with the proviso that the mole percent of SiO$_2$ is at least 1.86 times the mole percent of MnO$_2$. When the ceramic is applied at a thickness of 4.5 μm or less, the mole ratio of MnO$_2$ is at least 0.01 mole percent to no more than 8 mole percent and the SiO$_2$ is present in no more than 5.33 mole percent with the proviso that the mole percent of SiO$_2$ is less than 0.667 times the mole percent of MnO$_2$.

The preparation of laminated ceramic capacitors is well documented and the present invention does not alter the manufacturing process to any significant degree relative to standard procedures known in the art.

As an example of a manufacturing process, ceramic slurry is prepared by blending and milling the ceramic compounds described herein with a dispersant in either water or an organic solvent such as, for example, ethanol, isopropanol, toluene, ethyl acetate, propyl acetate, butyl acetate, mineral spirits or other suitable hydrocarbon liquid, or a blend thereof. After milling, a ceramic slip is prepared for tape-casting by adding a binder and a plasticizer to control rheology and to give strength to the tape. The obtained slip is then processed into a thin green sheet by tape-casting on a flat polymer film. After drying the sheet, a multiplicity of electrodes are patterned on the sheet by using, for example, a screen-printing method to form a printed ceramic sheet.

A laminated green body, or stack, is prepared by stacking onto a substance such as polycarbonate, polyester or a similar method: 1) a certain number of unprinted ceramic sheets representing the bottom covers, then 2) a certain number of printed ceramic sheets in alternate directions so as to create alternating electrodes that terminate at opposing ends, and 3) a certain number of unprinted ceramic sheets representing the top covers. Variations in the stacking order of the printed and unprinted sheets can be used with the dielectric material of this invention. The stack is then pressed at between 20° C. and 120° C. to promote adhesion of all laminated layers.

The laminated green body is then cut into individual green chips.

The green chip is heated to remove the binder. The binder can be removed by heating at about 200-700° C. in atmospheric air or neutral or slightly reducing atmosphere for about 0.5 to 48 hours.

The dielectric is then sintered in a reductive atmosphere with an oxygen partial pressure of $10^{-6}$ to $10^{-16}$ atm at a temperature not to exceed 1350° C. The preferred temperature is about 1,200 to 1,325° C. After sintering the dielectric is reoxidized by heating to a temperature of no more than about 1,100° C. at an oxygen partial pressure of about $10^{-5}$ to $10^{-10}$ atm. More preferably, the reoxidation is done at a temperature of about 800 to 1,100° C. The material resulting from this stage is typically referred to as a sintered chip.

composition. Temperature coefficient of capacitance (TCC) was measured at −55° C. and 125° C. at 1 V, 1 MHz with a Saunders & Associate chamber (6 samples each). Only the largest values of TCC between −55° C. and 125° C. are reported in Table 1. Insulation resistance was measured at 50 V DC at 25° C. and 125° C. in a Saunders & Associate chamber (6 samples). The 25° C. were all very high, in the TΩ range, and are not reported in Table 1. Breakdown voltage (UVBD) was measured using a H100DC tester (Rod-L Electronics, Inc.).

TABLE 1

Compositions and Electrical Properties of Example 1 Samples.

| Batch # | [MnO2], mol % | [SiO2], mol % | Firing Temperature (° C.) | Capacitance (nF) | DF (%) | TCC Max (ppm/° C.) | IR Test Voltage | 125° C. IR (GΩ) | 125° C. RC (Ω · F) | UVBD Average (V) |
|---|---|---|---|---|---|---|---|---|---|---|
| 15 | 0.00% | 0.00% | 1305 | 2739 | 0.026 | −28 | 50 | 45 | 122 | 628 |
| 6 | 0.91% | 8.15% | 1305 | 2465 | 0.087 | 15 | 50 | 456 | 1087 | 513 |
| 5 | 0.95% | 4.25% | 1305 | 2522 | 0.094 | −4 | 50 | 385 | 956 | 494 |
| 1 | 0.97% | 2.17% | 1305 | 2646 | 0.027 | 3 | 50 | 130 | 345 | 618 |
| 7 | 0.98% | 0.98% | 1305 | 2673 | 0.107 | −19 | 50 | 260 | 686 | 583 |
| 2 | 1.93% | 2.15% | 1305 | 2746 | 0.052 | −6 | 50 | 282 | 726 | 772 |
| 8 | 3.72% | 3.72% | 1305 | 2641 | 0.027 | 9 | 50 | 218 | 561 | 821 |
| 3 | 3.78% | 2.11% | 1305 | 3131 | 0.017 | 7 | 50 | 192 | 580 | 633 |
| 9 | 6.92% | 6.92% | 1305 | 2303 | 0.042 | 34 | 50 | 200 | 442 | 442 |
| 15 | 0.00% | 0.00% | 1325 | 2818 | 0.018 | −27 | 50 | 364 | 1003 | 599 |
| 6 | 0.91% | 8.15% | 1325 | 2470 | 0.144 | 17 | 50 | 429 | 1027 | 440 |
| 5 | 0.95% | 4.25% | 1325 | 2576 | 0.080 | −3 | 50 | 450 | 1140 | 531 |
| 1 | 0.97% | 2.17% | 1325 | 2585 | 0.037 | −7 | 50 | 376 | 973 | 580 |
| 7 | 0.98% | 0.98% | 1325 | 2649 | 0.091 | −24 | 50 | 370 | 969 | 501 |
| 2 | 1.93% | 2.15% | 1325 | 2660 | 0.102 | −7 | 50 | 412 | 1029 | 570 |
| 8 | 3.72% | 3.72% | 1325 | 2586 | 0.030 | 8 | 50 | 399 | 1004 | 798 |
| 3 | 3.78% | 2.11% | 1325 | 2683 | 0.019 | 6 | 50 | 296 | 766 | |
| 9 | 6.92% | 6.92% | 1325 | 2434 | 0.053 | −1 | 50 | 313 | 732 | 493 |

The sintered chip is subjected to end surface grinding by barrel or sand blast, as known in the art, followed by transferring outer electrode paste to form the external electrodes. Further baking is then done to complete the formation of the outer electrodes. The further baking is typically done in nitrogen or slightly oxidizing atmosphere at a temperature of about 600-1000° C. for about 0.1 to 1 hour.

Layers of nickel and tin or other suitable solder composition can then be plated on the outer electrodes to enhance solderability and prevent oxidation of the outer electrodes.

Example 1

A base formulation of $(CaO)_{0.7}(SrO)_{0.3}(ZrO_2)_{0.97}(TiO_2)_{0.3}$ was mixed into the milling solution and milled in an horizontal bead mill with 1 mm spherical media to $D_{50}$=0.35 μm. Separately $MnO_2$ and $SiO_2$ were mixed with milling solution and milled to less than ca. 0.4 μm using 1 mm media in a jar mill. The $MnO_2$ and $SiO_2$ were mixed with the base formulation. Tapes were coated via a tape caster using a doctor blade for a target fired dielectric thickness of about 6 μm. The Ni electrodes were deposited via screen printing using suitable ink. After lamination of a green stack and dicing to achieve singular green multilayer chip devices, the singular MLCCs were submitted to a thermal burnout process to remove the organic material. The chips were fired at 1305° C. and 1325° C. respectively, in a reducing atmosphere of about $10^{-6}$ to $10^{-16}$ atm $O_2$. The chips were subsequently corner rounded and terminated with a suitable copper termination. Similar chips were made with $MnO_2$ from 0 to 6.9 mol % and $SiO_2$ from 0 to 6.9 mol %, as shown in Table 1. Comparisons of the physical properties as a function of composition and firing temperature are shown in Table 1. Capacitance and dissipation factor (DF) were measured at 1 V, 1 MHz with a HP4275A LCR meter on 30 samples for each As seen in Table 1, high values of capacitance and low DF were achieved with most samples. All but one sample gave TCC within the C0G specification. IR are well above the C0G specification (125° C. RC product>100Ω·F).

Next, reliability performance of the present samples was measured and is summarized in Table 2. In Table 2, Si and Mn represent the mole fraction of each component. TH is the fired dielectric thickness in μm. Cap represents relative capacitance. DF is a relative dissipation factor. IR is relative insulation resistance. HALT is the results of a Highly Accelerated Life Test done for 92 hours at 175° C. under 8 times rated voltage wherein a rating of "good" indicates a mean time to failure (MTTF) of longer than 3000 minutes, "medium" represents an MTTF of longer than 500 minutes but shorter than 3000 minutes and "poor" represents an MTTF of less then 500 minutes. Life Test was conducted for 1000 hours at 2 times rated voltage at 125° C. on 77 pieces per batch. The measurement criterion is insulation resistance of the pieces before and after the test wherein a rating of "good" indicates zero pieces fail due to degradation of insulation resistance to below the IR limit recommended by Electronics Industry Association (EIA), "medium" indicates 1 to 3 pieces out of 77 pieces failed and "poor" indicates more than 3 pieces of 77 failed. Humidity Test was conducted for 1000 hours at the rated voltage at 85° C. at 85% relative humidity and the criteria are the same as for the Life Test.

As shown in Table 2, good reliability (all three of HALT, Life Test and Humidity Test performance) is only obtained for Si between 0 and 0.08, Mn between 0.0001 and 0.043 and Si≧1.86*Mn.

TABLE 2

|  | Si | Mn | TH | Cap | DF | IR | HALT | Life Test | Humidity Test |
|---|---|---|---|---|---|---|---|---|---|
| 01* | 0.01 | 0.01 | 6 | Good | Medium | Medium | Poor | Poor | Very Poor |
| 02* | 0.01 | 0.02 | 6 | Good | Good | Good | Poor | Poor | Poor |
| 03* | 0.02 | 0.02 | 6 | Good | Good | Good | Medium | Medium | Poor |
| Present Invention | $0 \leq Si \leq 0.08$ | $0.0001 \leq Mn \leq 0.043$ AND $Si \geq 1.86*Mn$ | 6 | Good | Good | Good | Good | Good | Good |

*Compositions outside the scope of the present invention.

Capacitors of the type disclosed herein may be substituted for polymer film capacitors, Al, Nb and Ta capacitors, or for existing noble metal or base metal electrode based MLCC capacitors. Both lower costs and superior TCC are possible in this family of formulations.

Example 2

A series of ceramic formulations comprising $(CaO)_{0.7}(SrO)_{0.3}(ZrO_2)_{0.97}(TiO_2)_{0.03}$ and additions of $SiO_2$ and $MnO_2$ was prepared as set forth in Table 3. The compositions were coated to target a fired dielectric thickness of 3 µm and the physical properties were measured as in Example 1 and recorded in Table 3.

TABLE 3

|  | Si | Mn | TH | Cap | DF | IR | HALT | Life Test | Humidity Test |
|---|---|---|---|---|---|---|---|---|---|
| 04* | 0.01 | 0.01 | 3 | Good | Good | Very Poor | Poor | Poor | Very Poor |
| 05* | 0.01 | 0.02 | 3 | Good | Good | Poor | Poor | — | Poor |
| 06* | 0.02 | 0.02 | 3 | Good | Good | Poor | Poor | — | Poor |
| 07 | 0.01 | 0.04 | 3 | Good | Good | Good | Good | Good | Good |
| 08 | 0.02 | 0.04 | 3 | Good | Good | Good | Good | Good | Good |
| Present Invention | $0 \leq Si \leq 0.053$ AND $Si \leq 0.6667*Mn$ | $0.0001 \leq Mn \leq 0.08$ | 3 | Good | Good | Good | Good | Good | Good |

*Compositions outside the scope of the present invention.

As indicated in Table 2 and 3 the results are dependent on the composition and dielectric thickness of the MLCC. At intermediate ratios of transition metal oxide and Group III/IV oxide the performance of the resultant capacitor is diminished relative to the present invention range.

The invention has been disclosed in consideration of specific examples which do not limit the scope of the invention. Modifications apparent to one having skill in the art subsumed within the scope of the invention.

The invention claimed is:

1. A dielectric ceramic composition in a multilayer ceramic capacitor consisting essentially of a composition of formula:

$$\{[(CaO)_t(SrO)_{1-t}]_m[(ZrO_2)_v(TiO_2)_{1-v}]\}_{1-s-x}A_sE_x$$

wherein:
A is a transition metal oxide of a transition metal selected from Cu, Mn, Mo, W, Ta, Sc, Y, Hf, Nb and combinations there of;
E is an oxide of an element selected from the group consisting of Ge, Si, Ga and combinations thereof;
m is 0.98 to 1.02;
t is >0.5 and $\leq 0.9$;
v is 0.8 to 1.0; and
s and x are selected from the group consisting of: a) $x \leq 0.08$, $0.0001 \leq s \leq 0.043$ and $x > 1.86s$; and b) $0 < x \leq 0.0533$, $0.0001 \leq s \leq 0.08$ and $x < 0.667s$.

2. The dielectric ceramic composition in a multilayer ceramic capacitor of claim 1 wherein s and x are defined by $x \leq 0.08$, $0.0001 \leq s \leq 0.043$ and $x > 1.86s$.

3. The dielectric ceramic composition in a multilayer ceramic capacitor of claim 1 wherein s and x defined by $0 < x \leq 0.0533$, $0.0001 \leq s \leq 0.08$ and $x < 0.667s$.

4. The dielectric ceramic composition in a multilayer ceramic capacitor of claim 1 wherein:
A is manganese oxide.

5. The dielectric ceramic composition in a multilayer ceramic capacitor of claim 1 wherein A is MnO and E is $SiO_2$.

6. The dielectric ceramic composition in a multilayer ceramic capacitor of claim 1 which has been fired at a temperature between 1200° C. and 1350° C.

7. The dielectric ceramic composition in a multilayer ceramic capacitor of claim 1 wherein said capacitor further comprises a base metal as the internal electrode material.

8. The dielectric ceramic composition in a multilayer ceramic capacitor of claim 4 wherein said capacitor further comprises a base metal as the internal electrode material.

9. The dielectric ceramic composition in a multilayer ceramic capacitor of claim 5 wherein said capacitor further comprises a base metal as the internal electrode material.

10. The dielectric ceramic composition in a multilayer ceramic capacitor of claim 9 wherein said base metal is selected from the group consisting of Ni or Cu and a combination thereof.

11. The dielectric ceramic composition in a multilayer ceramic capacitor of claim 10 which has been fired in a reducing atmosphere.

12. The dielectric ceramic composition in a multilayer ceramic capacitor according to claim 11 further comprising a metal electrode selected from the group consisting of Ni, Cu.

13. A dielectric ceramic composition in a multilayer ceramic capacitor consisting essentially of a composition of formula:

$$\{[(CaO)_t(SrO)_{1-t}]_m[(ZrO_2)_v(TiO_2)_{1-v}]\}_{1-s-x}A_sE_x$$

wherein:

A is a transition metal oxide of a transition metal selected from Cu, Mn, Mo, W, Ta, Nb and combinations there of;

E is an oxide of an element selected from the group consisting of Ge, Si, Ga and combinations thereof;

m is 0.98 to 1.02;

t is >0.5 and ≦0.9;

v is 0.8 to 1.0; and s and x are selected from the group consisting of: a) $x \leq 0.0001$, $s \leq 0.043$ and $x > 1.86s$; and b) $0 < x \leq 0.0533$, $0.0001 \leq s \leq 0.08$ and $x < 0.667s$.

14. The dielectric ceramic of claim 1 wherein said ceramic composition has a temperature coefficient of capacitance (TCC) of ≦+/−30 ppm/° C.

15. The dielectric ceramic of claim 13 wherein said ceramic composition has a temperature coefficient of capacitance (TCC) of ≦+/−30 ppm/° C.

* * * * *